(12) United States Patent
Oota et al.

(10) Patent No.: US 10,596,698 B2
(45) Date of Patent: Mar. 24, 2020

(54) MACHINE LEARNING DEVICE, ROBOT CONTROL SYSTEM, AND MACHINE LEARNING METHOD

(71) Applicant: FANUC CORPORATION, Yamanashi (JP)

(72) Inventors: Yuusuke Oota, Yamanashi (JP);
Fumikazu Warashina, Yamanashi (JP);
Hiromitsu Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 84 days.

(21) Appl. No.: 15/981,153

(22) Filed: May 16, 2018

(65) Prior Publication Data
US 2018/0370027 A1 Dec. 27, 2018

(30) Foreign Application Priority Data

Jun. 27, 2017 (JP) .................................. 2017-125285

(51) Int. Cl.
*B25J 9/16* (2006.01)
*B25J 19/02* (2006.01)
(Continued)

(52) U.S. Cl.
CPC .............. *B25J 9/161* (2013.01); *B25J 9/163* (2013.01); *B25J 9/1612* (2013.01); *B25J 9/1674* (2013.01); *B25J 9/1679* (2013.01); *B25J 9/1697* (2013.01); *B25J 19/023* (2013.01); *G06K 9/6255* (2013.01); *G06K 9/6262* (2013.01); *G06T 7/0004* (2013.01); *G05B 2219/37448* (2013.01);
(Continued)

(58) Field of Classification Search
CPC ......... G06T 7/0004; G06T 2207/20081; G06T 2207/20084; G06T 2207/30164; B25J 19/023; B25J 9/161; B25J 9/1612; B25J 9/163; B25J 9/1674; B25J 9/1697; G06K 2209/19; G06K 9/6255; G06K 9/6262
See application file for complete search history.

(56) References Cited

U.S. PATENT DOCUMENTS 9,671,777 B1 6/2017 Aichele et al.
2003/0182251 A1 9/2003 Kim et al.
(Continued)

FOREIGN PATENT DOCUMENTS

CN 102819264 12/2012
CN 104458755 3/2015
(Continued)

*Primary Examiner* — Ryan Rink
(74) *Attorney, Agent, or Firm* — Wenderoth, Lind & Ponack, L.L.P.

(57) ABSTRACT

A machine learning device that acquires state information from a robot control inspection system. The system has a robot hand to hold a workpiece or camera. The state information includes a flaw detection position of the workpiece, a movement route of the robot hand, an imaging point of the workpiece, and the number of imaging by the camera. A reward calculator calculates a reward value in reinforcement learning based on flaw detection information including the flaw detection position. A value function updater updates an action value function by performing the reinforcement learning based on the reward value, the state information, and the action.

10 Claims, 13 Drawing Sheets

1:MACHINE LEARNING SYSTEM

(51) Int. Cl.
*G06T 7/00* (2017.01)
*G06K 9/62* (2006.01)

(52) U.S. Cl.
CPC .............. *G05B 2219/45066* (2013.01); *G06K 2209/19* (2013.01); *G06T 2207/20081* (2013.01); *G06T 2207/20084* (2013.01); *G06T 2207/30164* (2013.01)

(56) References Cited

U.S. PATENT DOCUMENTS

| | | | |
|---|---|---|---|
| 2017/0032281 A1* | 2/2017 | Hsu | B23K 9/0953 |
| 2017/0193400 A1* | 7/2017 | Bhaskar | G06F 17/5009 |
| 2018/0035606 A1* | 2/2018 | Burdoucci | A01D 34/008 |
| 2018/0079076 A1* | 3/2018 | Toda | G06N 3/008 |
| 2018/0129974 A1* | 5/2018 | Giering | G06N 5/022 |
| 2018/0130199 A1* | 5/2018 | Brauer | G01N 21/9501 |
| 2018/0169856 A1* | 6/2018 | Murakami | B25J 9/161 |
| 2018/0341248 A1* | 11/2018 | Mehr | G05B 19/4099 |
| 2019/0080446 A1* | 3/2019 | Kuzmin | G06T 7/001 |
| 2019/0096055 A1* | 3/2019 | Namiki | B25J 9/1664 |
| 2019/0137254 A1* | 5/2019 | Trenholm | G01B 9/02087 |
| 2019/0139212 A1* | 5/2019 | Hanzawa | G06T 7/11 |
| 2019/0139213 A1* | 5/2019 | Kurita | G06T 7/0002 |
| 2019/0242319 A1* | 8/2019 | Matsumoto | F02D 35/024 |

FOREIGN PATENT DOCUMENTS

| | | |
|---|---|---|
| CN | 105690392 | 6/2016 |
| JP | 2009-14357 | 1/2009 |
| JP | 2010-134907 | 6/2010 |
| JP | 2017-94403 | 6/2017 |

\* cited by examiner

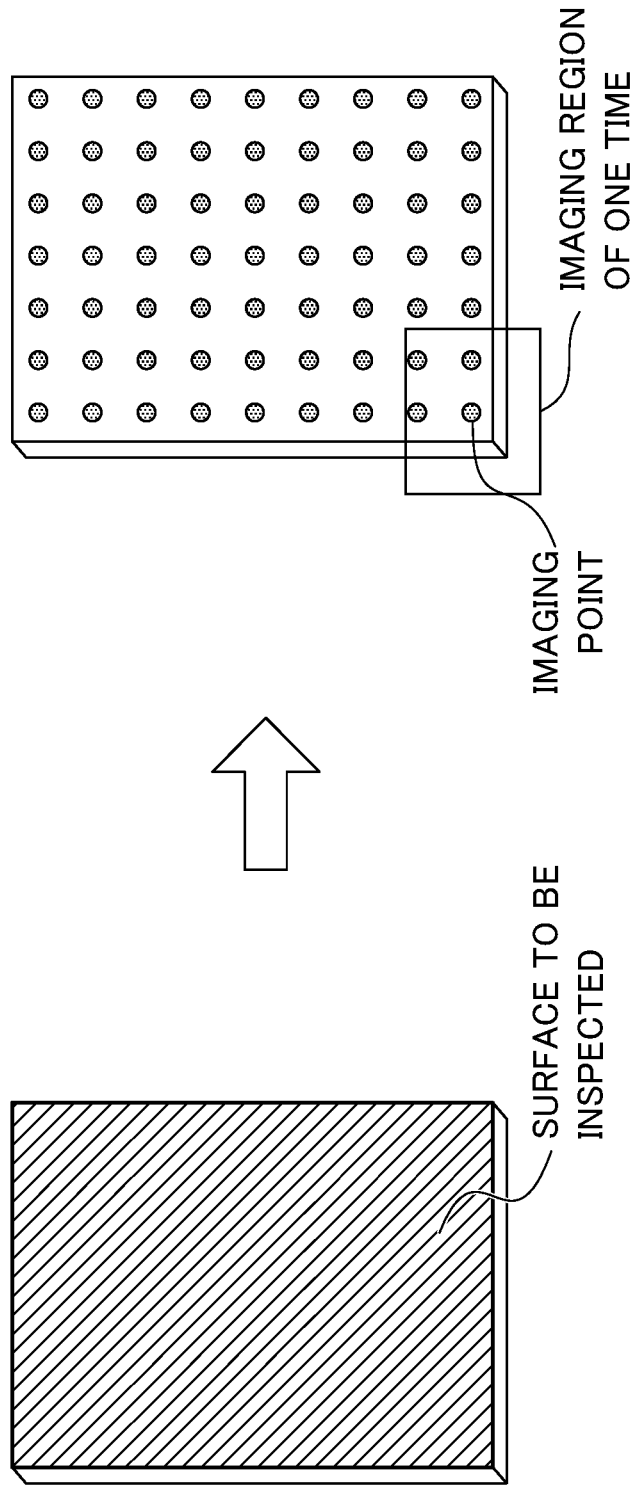

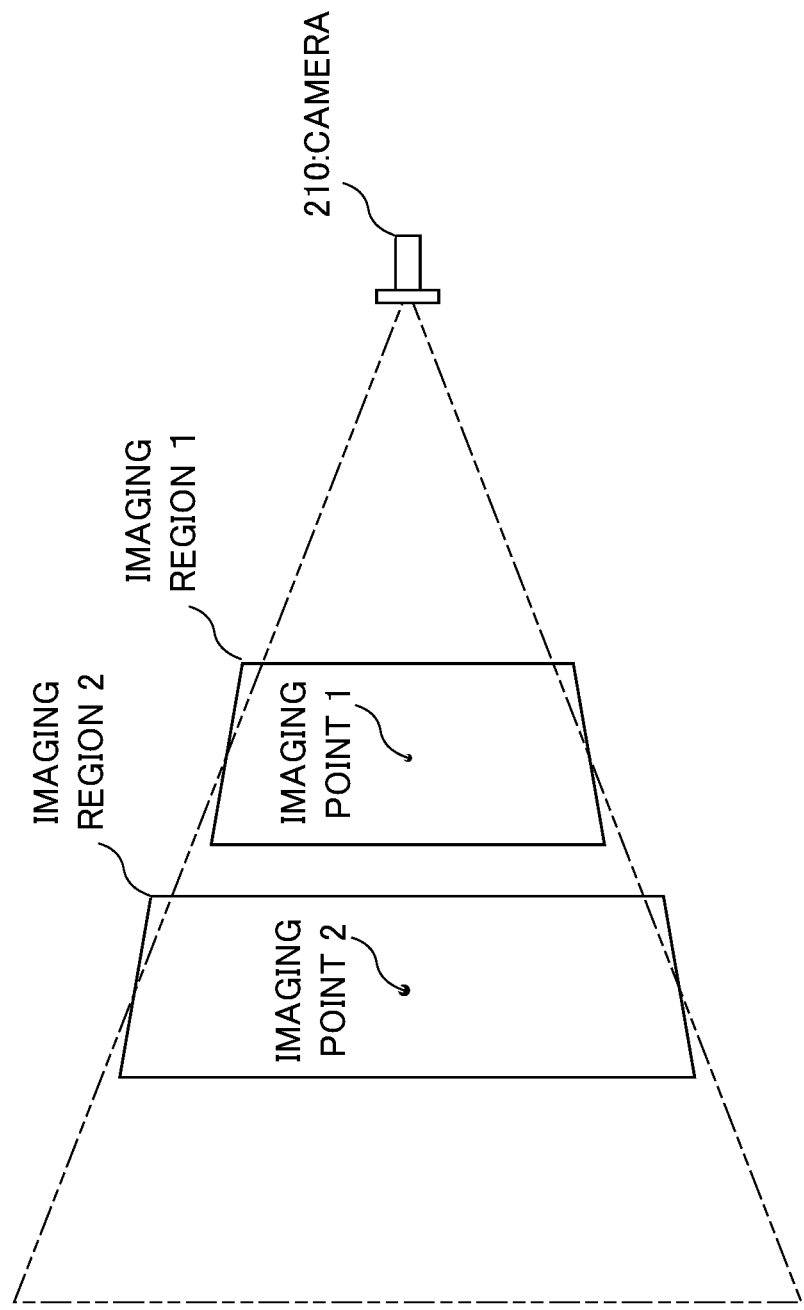

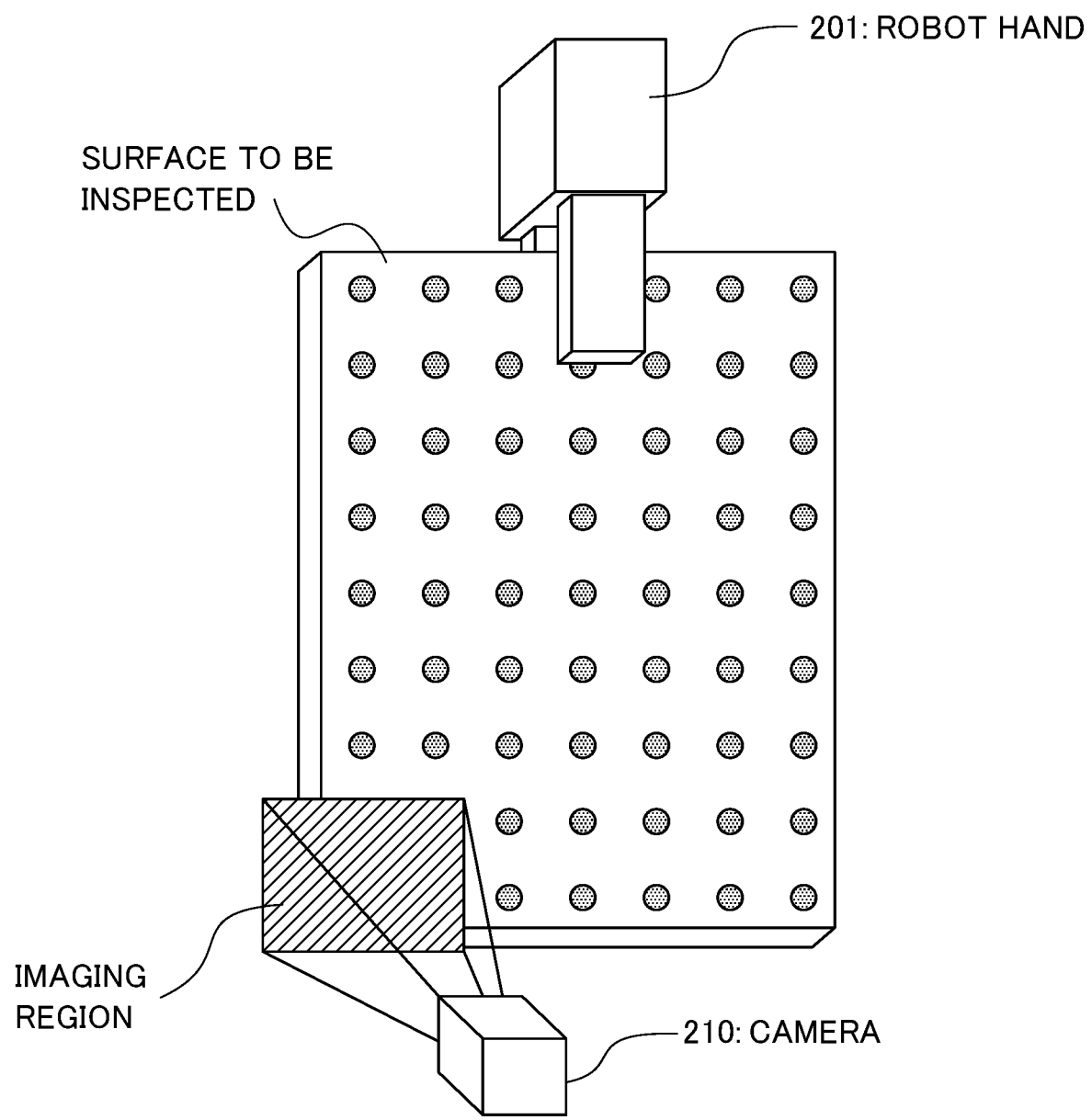

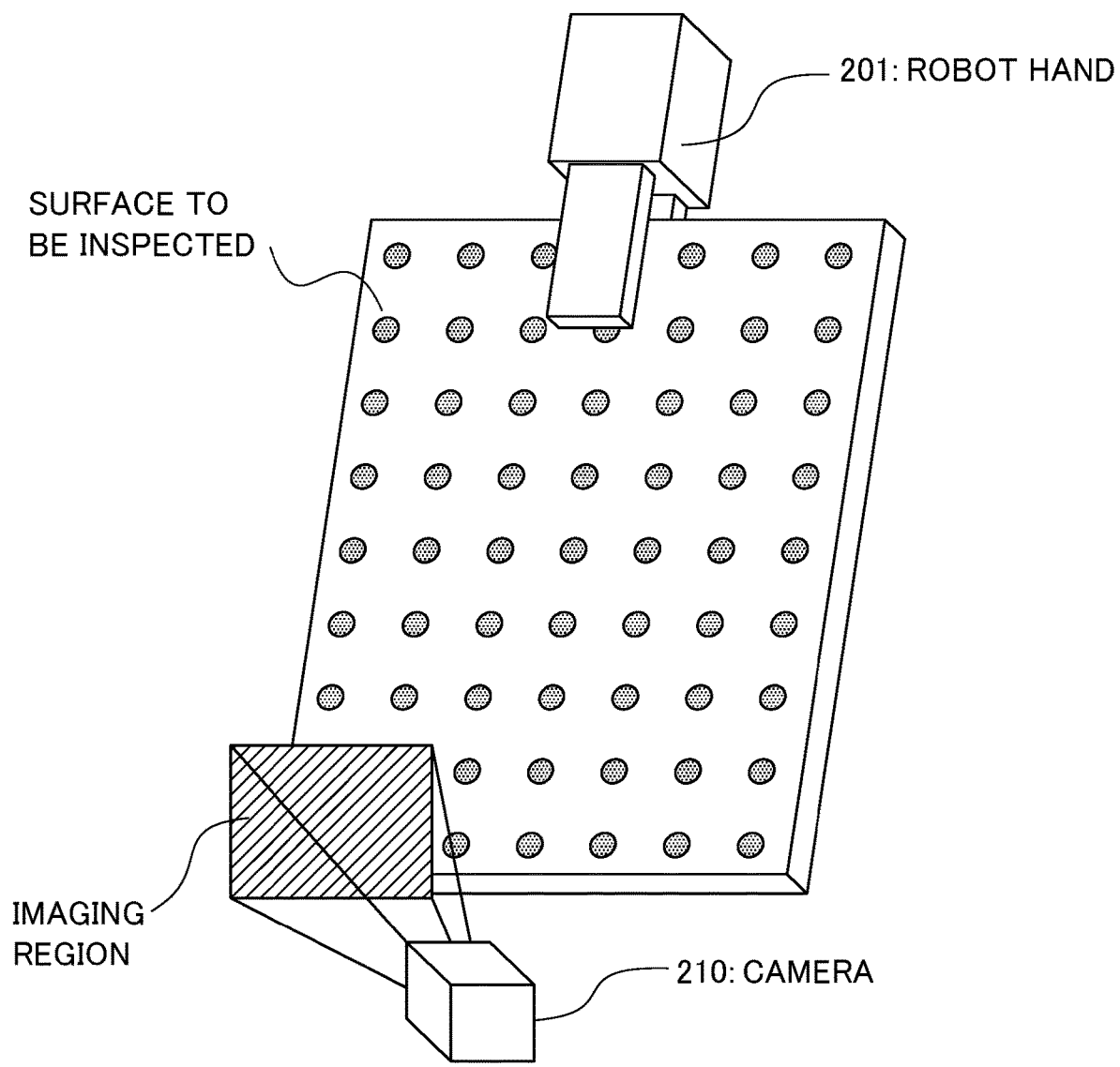

MACHINE LEARNING DEVICE, ROBOT CONTROL SYSTEM, AND MACHINE LEARNING METHOD

This application is based on and claims the benefit of priority from Japanese Patent Application No. 2017-125285, filed on 27 Jun. 2017, the content of which is incorporated herin by reference.

BACKGROUND OF THE INVENTION

Field of the Invention

The present invention relates to a machine learning device, a robot control system., and a machine learning method.

Related Art

For example, as disclosed in Patent Document 1, flaw inspection of a workpiece by causing a robot to hold the workpiece and a camera has been performed conventionally. For example, as disclosed in Patent Document 1, first, as a preparing work, a teaching step of causing an operation processing unit connected to a robot to store an inspection route and a plurality of imaging points is performed. In such teaching step, a plurality of imaging points are registered, a CCD camera provided in a tip end of the robot in each imaging point detects reflection light from an illumination means in the imaging point, and teaching is performed so that detected optical information is output as a pulse signal. Thereby, the inspection route and the plurality of imaging points are stored in a teaching unit of an operation processing unit connected to the robot as an operation program. In this way, in the flaw inspection using a robot, it is necessary that a position of the robot is taught, and an imaging position of a workpiece is specified. As a specification method of an imaging position, there is a method of uniformly imaging a range to be inspected. However, when the entire range is carefully inspected, the following two points become problems. First, in the flaw inspection, inspection is often performed in a state where resolution of a camera is increased and a size of a field of view is set to be small, in order not to overlook even a small flaw. Thus, a range that can be inspected by one imaging becomes small, and imaging needs to be repeated in short intervals. Second, the imaging appearance of a flaw varies depending on a positional relationship of a camera, a workpiece, and an illumination. Depending on the positional relationship, a flaw may be overlooked. Accordingly, in order to reduce the number of flaws that are overlooked, imaging needs to be performed while a positional relationship of a camera, a workpiece, and an illumination is changed in each position.

Patent Document 1: Japanese Unexamined Patent Application, Publication No. 2009-014357

SUMMARY OF THE INVENTION

As described above, in flaw inspection using a robot, it is required that an imaging point (imaging position) is determined so that the entire surface to be inspected is finely imaged when an imaging position of a workpiece is specified, so that even a small flaw is not overlooked, and a plurality of robot positions are taught so that a direction of a workpiece varies in the same position (that is, a direction of an illumination varies) so that the imaging appearance of a flaw due to a positional relationship of a camera, an illumination, and a workpiece is considered. On the other hand, there are often some tendencies in a portion where a flaw is generated (a generation portion of a flaw), a shape (characteristic) of a flaw to be generated (a type of a flaw), and the like, depending on the machining condition of a workpiece, and the like. The vulnerability to flaws and inspection accuracy required for a function and appearance vary depending on a position of a workpiece. Thus, for example, when a person performs inspection, the person can look carefully at positions to be looked carefully, and look briefly at positions that are unlikely to nave a failure, after gaining enough experience. In flaw inspection using a robot, as similar to when inspection is performed by a person, it is required that positions with high possibility of generation of a flaw are inspected carefully, and positions with low frequency of generation of a flaw are briefly inspected, so that the number of imaging pieces and imaging positions are optimized, and a cycle time of the inspection is reduced.

The present invention is made in consideration of the problem. An object of the present invention is to provide: a machine learning device that carefully inspects positions having high possibility of generation of a flaw, and briefly inspects positions having low frequency of generation of a flaw, so that the number of imaging pieces and imaging positions are optimized, and a cycle time of the inspection is reduced, in flaw inspection using a robot; a robot control system; and a machine learning method.

(1) A machine learning device (for example, a machine learning device 10 described later) of the present invention configured to perform reinforcement learning with respect to a robot control system (for example, a robot control inspection system 20 described later) that includes: an illumination means (for example, an illumination 220 described later) that irradiates a surface to be inspected of an object to be inspected (for example, a workpiece 50 described later) with illumination light; an imaging means (for example, a camera 210 described later) that images the surface to be inspected; a robot (for example, a robot 200 described later) that includes a robot hand (for example, a robot hand 201 described later); a control unit (for example, a control device 300 described later) that, while moving the robot hand gripping the object to be inspected or the imaging means, along a movement route including a plurality of imaging points set on the surface to be inspected so that the surface to be inspected is entirely covered by a plurality of images imaged by the imaging means, causes the imaging means to image in the imaging points set on the surface to be inspected; and a flaw inspection unit (for example, a flaw inspection device 400 described later) that detects a flaw on the surface to be inspected on the basis of the image obtained by imaging the surface to be inspected by the imaging means, in the imaging points, the machine learning device including: an action information output unit (for example, an action information output unit 130 described later) that outputs action information including adjustment information of the imaging region including the imaging points, to the control unit; a state information acquisition unit (for example, a state information acquisition unit 110 described later) that acquires from the control unit and the flaw inspection unit, state information including flaw detection information including a flaw detection position of the surface to be inspected detected by the flaw inspection unit, and the number of imaging, on the basis of an image obtained by imaging the surface to be inspected by the imaging means, by moving the robot hand gripping the object to be inspected or the imaging means by the control unit, on the basis of the action information, with respect to each of a plurality of objects to be inspected prepared in advance; a reward output unit (for example, a reward calculation unit 121 described later) that outputs a reward value in the reinforcement learning on the basis of the flaw detection information including the flaw detection positions included in the state information, and the number of imaging; and a value function updating unit (for example, a value function updating unit 122 described later) that updates an action value function on the basis of the reward value, the state information, and the action information.

(2) In the machine learning device according to (1), the reward output unit may set the reward value to be a positive value when the number of the flaw detection positions detected by the flaw inspection unit is equal to the number of the flaw detection positions detected by the flaw inspection unit in an initial state at machine learning start time of imaging an imaging region including predetermined imaging points, and when the number of imaging is smaller than the number of imaging in the initial state of the machine learning start time, and set the reward value to be a negative value when the number of the flaw detection positions detected by the flaw inspection unit is smaller than the number of the flaw detection positions detected by the flaw inspection unit in the initial state of the machine learning start time of imaging the imaging region including the predetermined imaging points.

(3) In the machine learning device according to (2), the reward output unit may set the reward value to be a larger value as the number of imaging is smaller than the number of imaging in the initial state of the machine learning start time, when the number of the flaw detection positions detected by the flaw inspection unit is equal to the number of the flaw detection positions detected by the flaw inspection unit in the initial state of the machine learning start time of imaging the imaging region including the predetermined imaging points.

(4) In the machine learning device according to (2) or (3), the machine learning device may include an optimizing action information output unit that generates optimizing action information with which the number of the flaw detection positions is equal to the number of the flaw detection positions detected by the flaw inspection unit in the initial state of the machine learning start time, and the number of the imaging is the minimum, on the basis of the action value function updated by the value function updating unit.

(5) In the machine learning device according to (1), the reward output unit may set the reward value to be a positive value when the number of the flaw detection positions in the predetermined region of the surface to be inspected, detected by the flaw inspection unit, is equal to the number of the flaw detection positions in the predetermined region of the surface to be inspected, detected by the flaw inspection unit in the initial state of the machine learning start time of imaging the imaging region including the predetermined imaging points, and when the number of imaging is smaller than the number of imaging in the initial state of the machine learning start time, and set the reward value to be a negative value when the number of the flaw detection positions in the predetermined region of the surface to be inspected detected by the flaw inspection unit is smaller than the number of the flaw detection positions in the predetermined region of the surface to be inspected detected by the flaw inspection unit in the initial state of the machine learning start time of imaging the imaging region including the predetermined imaging points.

(6) In the machine learning device according to (5), the reward output unit may set the reward value to be a larger value as the number of imaging is smaller than the number of imaging in the initial state of the machine learning start time, when the number of the flaw detection positions in the predetermined region of the surface to be inspected, detected by the flaw inspection unit is equal to the number of the flaw detection positions in the predetermined region of the surface to be inspected, detected by the flaw inspection unit in the initial state of the machine learning start time of imaging the imaging region including the predetermined imaging points.

(7) In the machine learning device according to (5) or (6), the machine learning device may include an optimizing action information output unit (for example, an optimizing action information output unit 150 described later) that generates on the basis of the action value function updated by the value function updating unit, optimizing action information with which the number of the flaw detection positions in the predetermined region of the surface to be inspected is equal to the number of the flaw detection positions in the predetermined region of the surface to be inspected, detected by the flaw inspection unit in the initial state at the machine learning time of imaging the imaging region including the predetermined imaging points, and the number of imaging is the minimum.

(8) In the machine learning device according to any one of (1) to (7), the action value function may be shared with other machine learning devices, and the value function updating unit may update the action value function that is shared.

(9) A robot control system according to the present invention includes the machine learning device according to any one of (1) to (8).

(10) A machine learning method according to the present invention is a machine learning method by a machine learning device that performs reinforcement learning with respect to a robot control system that includes: an illumination means that irradiates a surface to be inspected of an object to be inspected with illumination light; an imaging means that images the surface to be inspected; a robot that includes a robot hand; a control unit that, while moving the robot hand gripping the object to be inspected or the imaging means, along a movement route including a plurality of imaging points set on the surface to be inspected so that the surface to be inspected is entirely covered by a plurality of images imaged by the imaging means, causes the imaging means to image in the imaging points set on the surface to be inspected; and a flaw inspection unit that detects a flaw on the surface to be inspected on the basis of the image obtained by imaging the surface to be inspected by the imaging means, in the imaging points, the machine learning method including: an action information output step of outputting action information including adjustment information of the imaging region including the imaging points, to the control unit; a state information acquisition step of moving the robot hand gripping the object to be inspected or the imaging means by the control unit on the basis of the action information, and acquiring from the control unit and the flaw inspection unit, state information including flaw detection information including a flaw detection position detected by the flaw inspection unit on the basis of an image obtained by imaging the surface to be inspected by the imaging means, and the number of imaging, with respect to each of a plurality of objects to be inspected prepared in advance; a reward output step of outputting a reward value in the reinforcement learning on the basis of the flaw detection information including the flaw detection positions included in the state information, and the number of imaging; and a value function update step of updating an action value function on the basis of the reward value, the state information, and the action information.

According to the present invention, a machine learning device that can optimize the number of imaging pieces and imaging positions and reduce a cycle time of the inspection by carefully inspecting positions having high possibility of generation of a flaw and briefly inspecting positions having low frequency of generation of a flaw and positions having low importance, in flaw inspection using a robot, a robot control system, and a machine learning method can be provided.

BRIEF DESCRIPTION OF THE DRAWINGS

FIG. 4A is a diagram showing an example of imaging points provided on a surface to be inspected of a workpiece 50 and an imaging region including the imaging points, in the embodiment of the present invention.

FIG. 4B is a diagram showing a relationship of the imaging points provided on the surface to be inspected of the workpiece 50, the imaging region including the imaging points, and a camera in the embodiment of the present invention.

FIG. 4C is a diagram showing an example of an orientation of the imaging points provided on the surface to be inspected of the workpiece 50 and the workpiece 50 in the imaging points, in the embodiment of the present invention.

FIG. 4E is a diagram showing an example of the orientation of the imaging points provided on the surface to be inspected of the workpiece 50 and the workpiece 50 in the imaging points, in the embodiment of the present invention.

DETAILED DESCRIPTION OF THE INVENTION

Figure 1:
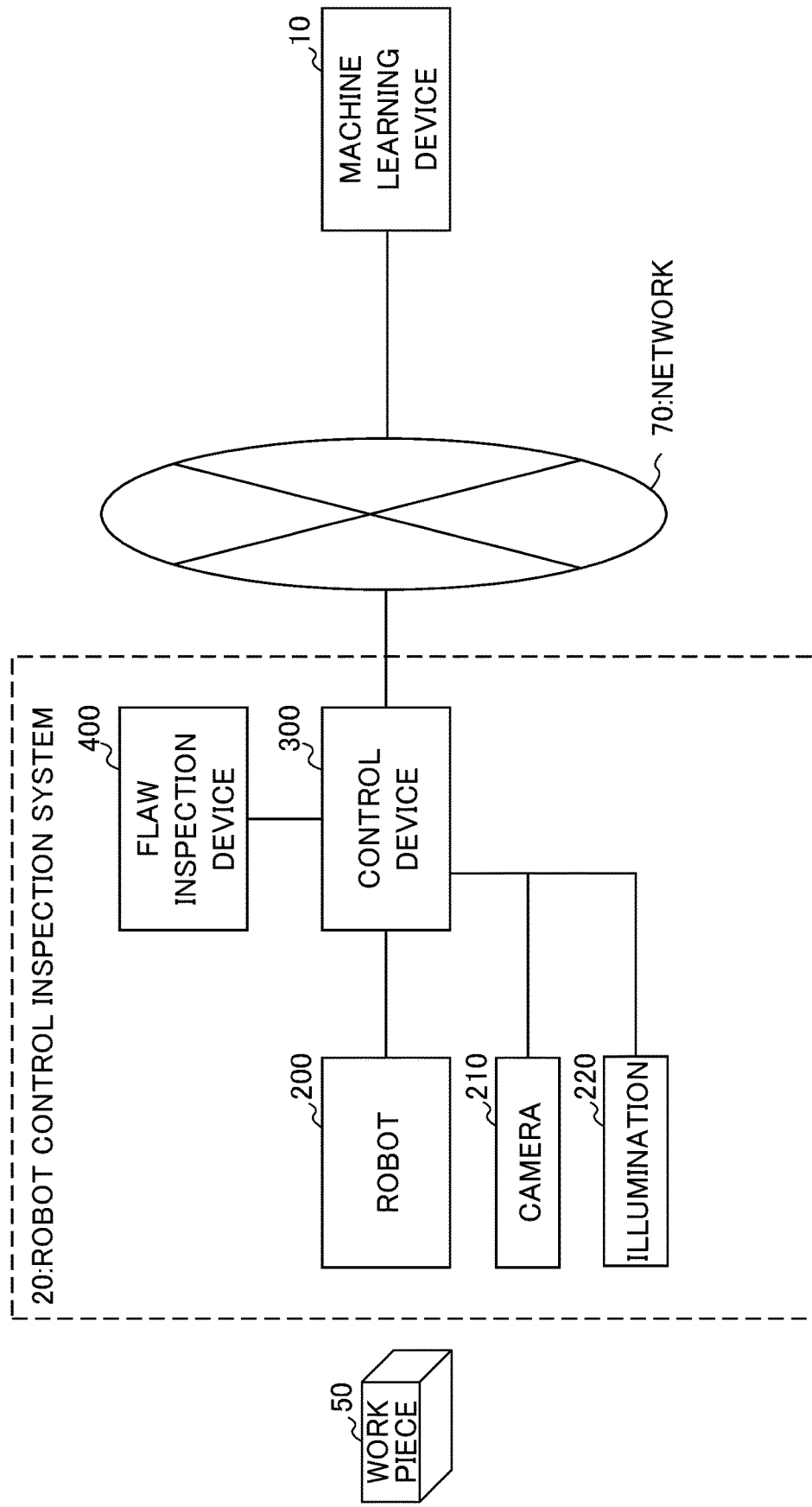
FIG. 1 is a block diagram showing a basic configuration of the entire of an embodiment of the present invention.
Figure 2:
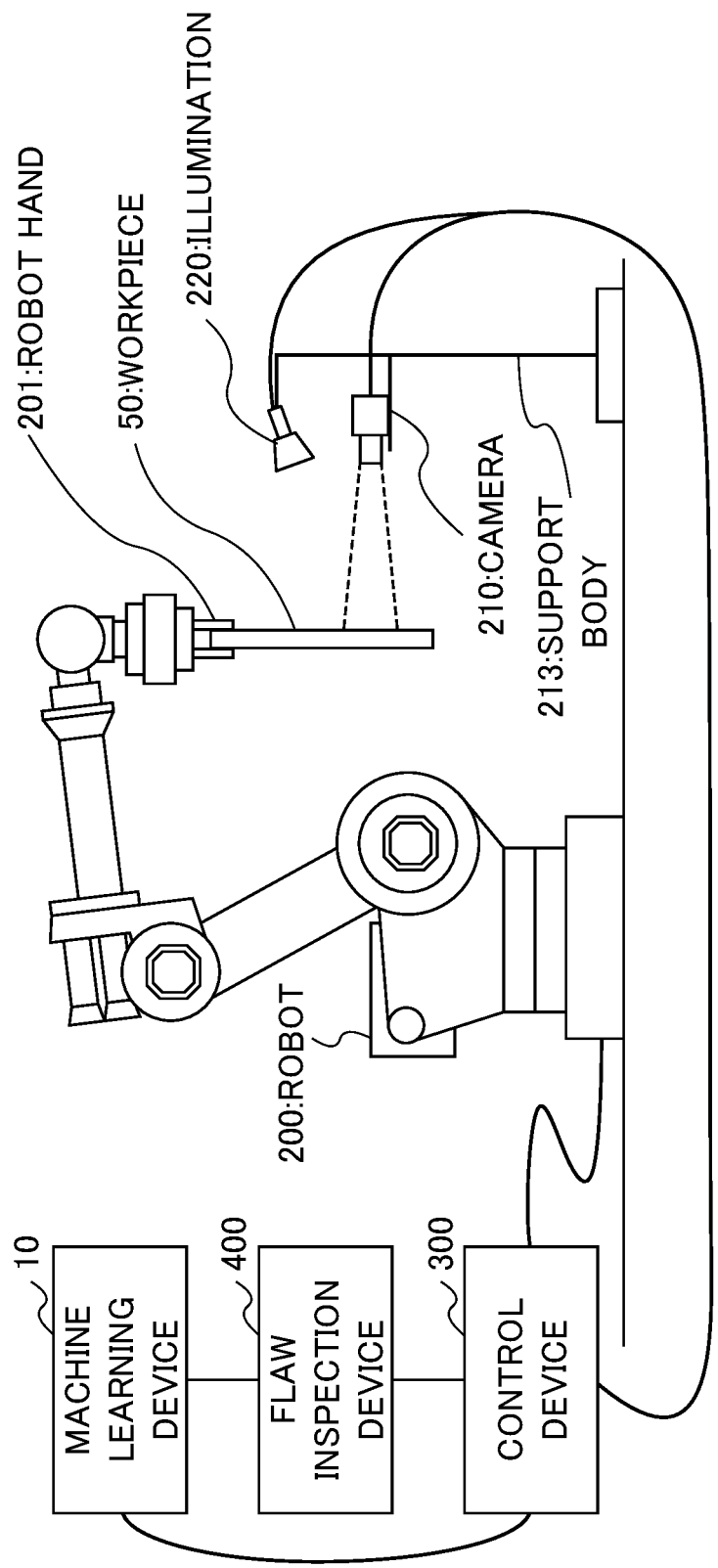
FIG. 2 is a schematic: view of a machine learning system of the embodiment of the present invention.

An embodiment of the present invention will be described in detail below with reference to drawings.
<Overall Configuration of Embodiment>
FIG. 1 is a function block diagram, showing an overall configuration of a machine learning system 1 of the present embodiment. FIG. 2 is a schematic view of the machine learning system 1 of the embodiment of the present invention. As shown in FIG. 1 and FIG. 2, the machine learning system 1 is configured to include a machine learning device 10, a robot control inspection system 20, and a workpiece 50. The robot control inspection system 20 includes a robot 200, a camera 210, an illumination 220, a control device 300, and a flaw inspection device 400. The machine learning device 10, and the control device 300 and the flaw inspection device 400 are connected via a network 7 0 as shown in FIG. 1, or connected directly via a connection interface as shown in FIG. 2, and can communicate with each other. The network 70 is, for example, a local area network (LAN) constructed in a factory, the Internet, a public telephone network, or a combination thereof. The particular communication method in the network 70, which of wired connection and wireless connection is used, and the like, is not limited particularly.

The machine learning device 10 is a device that performs machine learning for reducing a cycle time of inspection by carefully inspecting positions having high possibility of generation of a flaw, and briefly inspecting positions having low frequency of generation of a flaw, to optimize the number of imaging pieces and imaging positions, in flaw inspection of the workpiece 50 being an object to be inspected, using the robot control inspection system 20. The machine learning device 10 can be realized by a personal computer, a server device, a computerized numerical control (CNC) device or the like. Details of the machine learning device 10 will be described later.

The robot control inspection system 20 will be described. As described above, the robot control inspection system 20 includes the robot 200, the camera 210, the illumination 220, the control device 300, and the flaw inspection device 400.

As shown in FIG. 2, the robot 210 includes a robot hand 201, the posture of which is controlled to various positions and angles. The robot 200, for example, grips in series the workpieces 50 being a plurality of objects to be inspected that are prepared in a workpiece storage space. The robot hand 201 can change the position and posture of the gripped workpiece 50. When the workpiece 50 has a plurality of surfaces to be inspected in an outer shape, flaw inspection is performed for each surface to be inspected of the workpiece 50. In this case, the flaw inspection may be performed for each surface to be inspected of each of the surfaces to be inspected. Thus, in the present embodiment, a case where the flaw inspection of a predetermined surface to be inspected in the workpiece 50 is performed is described.

The camera 210 is an imaging means of imaging the surface to be inspected of the workpiece 50, and, for example, is composed of an imaging element such as a CCD image sensor and a CMOS image sensor. The camera 220 is supported in a predetermined posture so that the surface to be inspected of the workpiece 50 gripped by the robot hand 201 can be imaged, by a support body 213. The illumination 220 is supported in a predetermined posture so as to irradiate the surface to be inspected of the workpiece 50 gripped by the robot hand 201 with light, by the support body 213 as similar to the camera 210. The illumination 220, for example, is configured as appropriate, according to the object to be inspected, to be a ring illumination or a dome illumination irradiating with light from a periphery of the surface to be inspected of the workpiece 50, a bar illumination irradiating with light from one direction, or the like. In the present embodiment, the camera 210 and the illumination 220 that compose an optical system are provided in a fixed state. That is, the robot control inspection system 20 is configured so that the position and posture of the workpiece 50 gripped by the robot hand 201 are changed by the operation of the robot hand 201, and thereby, the imaging region including the imaging points set on the surface to be inspected of the workpiece 50 is imaged by the camera 210. The present embodiment is configured so that the camera 210 is fixed and the workpiece 50 is moved in order to change the relative positional relationship between the workpiece 50 and the camera 210. However, the configuration is not limited thereto. For example, the present invention may be configured so that the workpiece 50 is fixed, the camera 210 is gripped by the robot hand 201, and the position and posture of the gripped camera 210 can be changed.

<Control Device 300>

Figure 3:
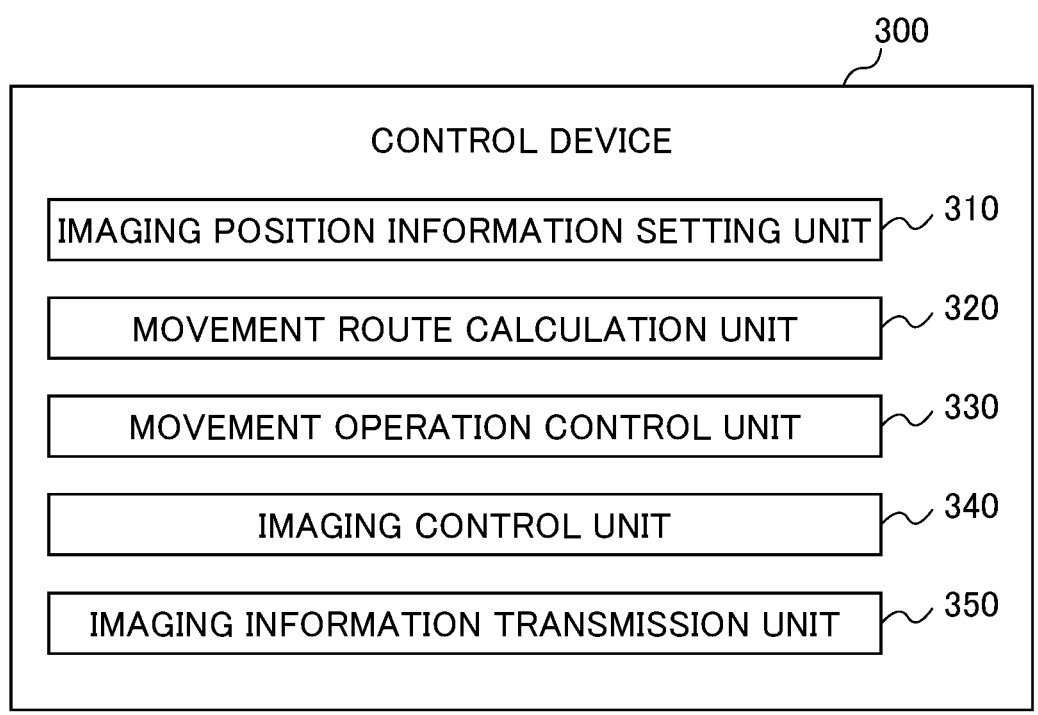
FIG. 3 is a function block diagram, of a control device 300 in the embodiment of the present invention.

The control device 300 causes the camera 210 to image in each imaging point set on the surface to be inspected of the workpiece 50, while moving the robot hand 201 gripping the workpiece 50, along a movement route including a plurality of imaging points set on the surface to be inspected so that the surface to be inspected of the workpiece 50 is entirely covered by a plurality of images imaged by the camera 210. More particularly, for example, as disclosed in Patent Document 1, a teaching step of causing the control device 300 connected to the robot 200, to store the movement route and the plurality of imaging points, is performed. In such teaching step, the plurality of imaging points are registered, and teaching is performed so that the camera 210 images reflection light from the illumination 220 in the imaging points (the imaging region), in each imaging point, and thereby, the movement route and the plurality of imaging points (the imaging region) are stored as an operation program, in the control device 300 connected to the robot 200. Thereby, the control device 300 receives operation instruction to move the robot hand 201 so that the registered imaging points are the imaging points of when imaging is performed by the camera 210. FIG. 3 shows a function block diagram of the control device 300. As shown in FIG. 3, the control device 300 includes an imaging position information setting unit 310, a movement route calculation unit 320, a movement operation control unit 330, an imaging control unit 340, and an imaging information transmission unit 350.

<Imaging Position>

Figure 4D:
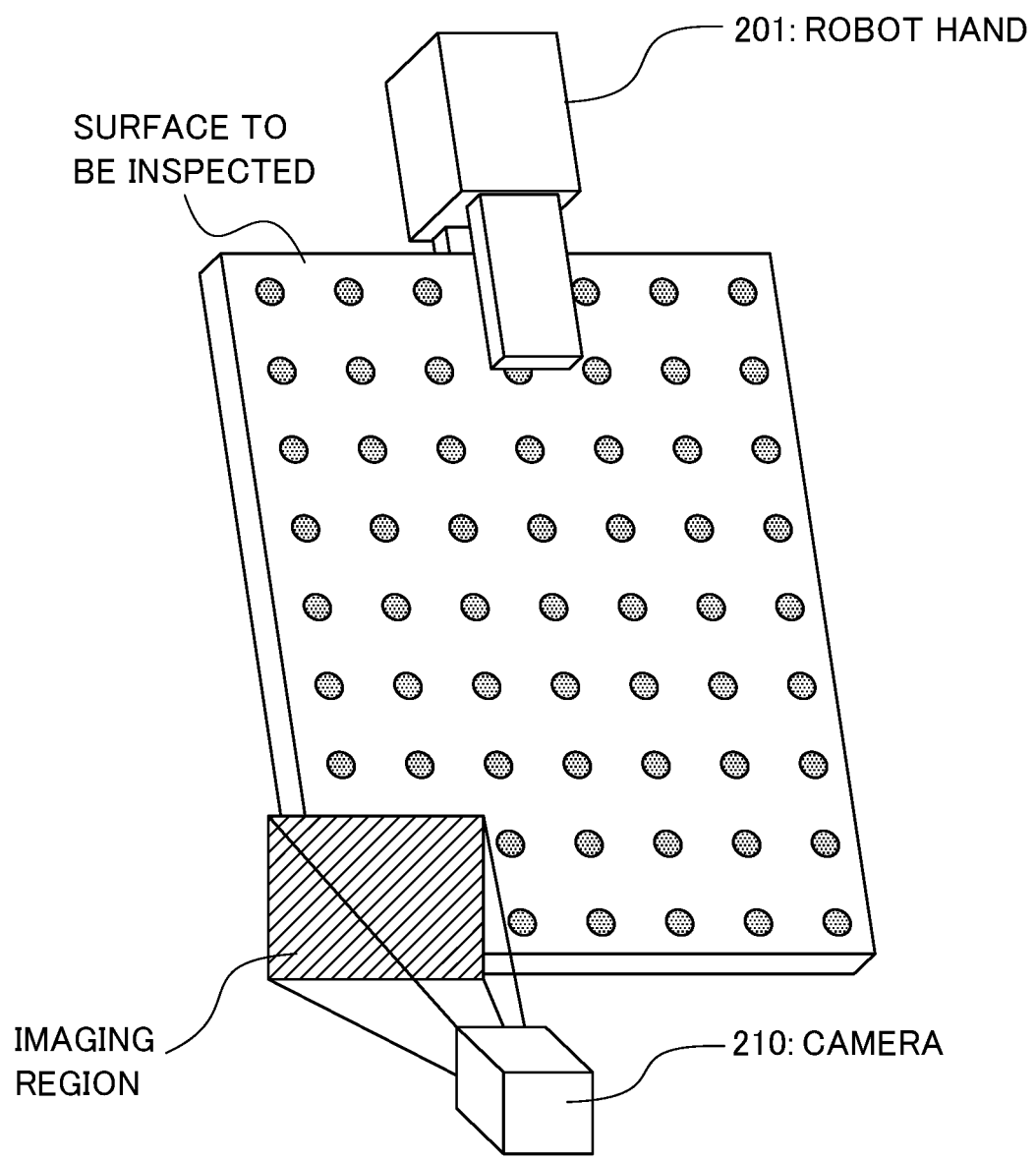
FIG. 4D is a diagram showing an example of the orientation of the imaging points provided on the surface to be inspected of the workpiece 50 and the workpiece 50 in the imaging points, in the embodiment of the present invention.

Before a function of the imaging position information setting unit 310 is described, the imaging position will be described with reference to FIG. 4A to FIG. 4E. FIG. 4A to FIG. 4E are diagrams showing a positional relationship between the surface to be inspected of the workpiece 50 (gripped by the robot hand 201), and an optical axis of the camera 210 (and the illumination light of the illumination 220). In the present embodiment, as described above, the camera 210 and the illumination 220 that compose the optical system are provided in a fixed state. That is, the robot control inspection system 20 is configured so that the position and posture of the workpiece 50 gripped by the robot hand 201 are changed by the operation of the robot hand 201, and thereby, the imaging region including the imaging points set on the surface to be inspected of the workpiece 50 is imaged by the camera 210. As shown in FIG. 4A, the imaging point means a point located on the optical axis of when the imaging is performed by the camera 210, and the imaging region means an imaging range imaged by the camera 210. When a distance from the camera 210 to the imaging point is snort, the imaging region is small (the field of view is small) as in an imaging region 1 shown in FIG. 4B. When the distance from the camera 210 to the imaging point is long, the imaging region is large (the field of view is large) as in an imaging region 2. In this way, when the surface to be inspected of the workpiece 50 is imaged by the camera 210, the number of imaging can be increased or decreased by adjusting the distance from the camera 210 to the imaging point, within a range of focus in the imaging point. When the surface to be inspected of the workpiece 50 is imaged by the camera 210, depending on a shape of a flaw formed on the surface to be inspected of the workpiece 50, a plurality of positional relationships of the camera 210 and the illumination 220, and the imaging point of the workpiece 50 need to be set. Thus, the accuracy of the flaw inspection can be improved by, in addition to the imaging in which the imaging region including the imaging point is perpendicular to the optical axis of the camera 210 (and the illumination light of the illumination 220), for example, as shown in FIG. 4C, adjusting the orientation of the workpiece 50 gripped by the robot hand 201, by the operation of the robot hand 201, for example, as shown in FIG. 4D or FIG. 4E, so that, in the same imaging point, the imaging region including the imaging point has an angle that is not perpendicular to the optical axis of the camera 210 and the illumination light of the illumination 220. In this way, when the surface to be inspected of the workpiece 50 is imaged by the camera 210, by specifying the imaging point, the distance from the camera 210 to the imaging point, and the orientation of the workpiece 50 in the imaging point (hereinafter, these are referred to as "imaging position information"), the positional relationship of the surface to be inspected of the workpiece 50 gripped by the robot hand 201, and the optical axis of the camera 210 and the illumination light of the illumination 220 is uniquely determined, and the imaging region of the surface to be inspected imaged by the camera 210 is uniquely determined.

The imaging position information setting unit 310 sets the imaging position information in the surface to be inspected of the workpiece 50 gripped by the robot hand 201. As described later, the imaging position information is set on the basis of the action information or the optimizing action information output from the machine learning device 100.

The movement route calculation unit 320 calculates the movement route of the robot hand 201 on the basis of the positional relationship of the surface to be inspected of the workpiece 50 gripped by the robot hand 201, and the optical axis of the camera 210 and the illumination light of the illumination 220 that is uniquely determined by the imaging position information in the surface to be inspected set by the imaging position information setting unit 310.

The movement operation control unit 330 moves the robot hand 201 on the basis of the movement route of the robot hand 201 calculated by the imaging position information setting unit 310. Thereby, the positional relationship of the surface to be inspected of the workpiece 50 gripped by the robot hand 201, and the optical axis of the camera 210 and the illumination light of the illumination 220 is controlled so that all imaging points included in the imaging position information set by the imaging position information setting unit 310 are covered by the imaging points where imaging is performed by the camera 210.

When the robot hand 201 reaches the imaging position included in the imaging position information by the movement operation control unit 330, the imaging control unit 340 controls the camera 210 to image the reflection light from the illumination 220.

The imaging information transmission unit 350 transmits the image of the workpiece 50 imaged by the imaging control unit 340 in association with each imaging position included in the imaging position information, to the flaw inspection device 400. It is desirable that the image of the workpiece 50 imaged is transmitted every time imaging is performed. However, imaged images may be batch transmitted collectively. The imaging information transmission unit 350 also transmits the imaging position information and the number of imaging to the machine learning device 10.

The control device 300 and the robot 200, the camera 210, and the illumination 220 are paired one to one, and are communicatively connected. The control device 300 and the robot 200, the camera 210, and the illumination 220 may be directly connected via a connection interface, or may be connected via a network such as a local area network (LAN).

<Flaw Inspection Device 400>

Figure 5:
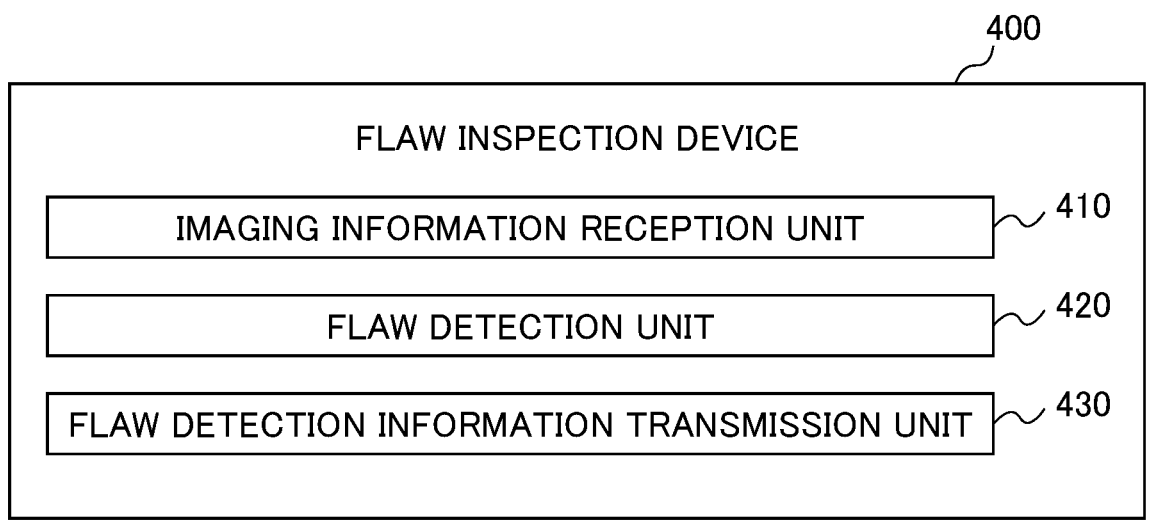
FIG. 5 shows a function block diagram of a flaw inspection device 400 in the embodiment of the present invention.

FIG. 5 shows a function block diagram of the flaw inspection device 400. As shown in FIG. 5, the flaw inspection device 400 includes an imaging information reception unit 410, a flaw detection unit 420, and a flaw detection information transmission unit 430. The imaging information reception unit 410 receives the image of the workpiece 50 associated with the imaging position information, of the surface to be inspected of the workpiece 50, from the control device 300. The flaw detection unit 420 determines the presence of a flaw of the workpiece 50 for each image associated in the imaging position included in the imaging position information. The determination of a flaw may be performed, for example, on the basis of a brightness value. When a flaw of the workpiece 50 is detected, the flaw detection unit 420 specifies the flaw detection position (position information) and the number of flaws for each image associated with the imaging position information in the workpiece 50. Then, the flaw detection unit 420, for example, can convert the position information in the image in which a flaw is detected to the position information on the surface to be inspected of the workpiece 50, to specify the flaw detection position on the surface to be inspected of the workpiece 50. The flaw detection information transmission unit 430 transmits to the machine learning device 10, flaw detection information including the flaw detection position (position information) and the number of flaws for each image associated with the imaging position information of the workpiece 50 detected by the flaw detection unit 420, and the position information of all flaws detected on the surface to be inspected of the workpiece 50 and the number of flaws. When a flaw of the workpiece 50 is not detected by the flaw detection unit 420, the flaw detection information transmission unit 430 transmits detected flaw absence information on the workpiece 50 to the machine learning device 10.

In the flaw inspection of the workpiece 50 being an object to be inspected, using the robot control inspection system 20, as described later, the machine learning device 10 sets the imaging region including the predetermined imaging point in advance, and adjusts the imaging region including the imaging point so as to detect flaw information that is equal to the detected flaw detection information of the workpiece 50 observed in a initial state sa, with the flaw detection information including the flaw detection position of the workpiece 50 observed in the initial state $s_0$ at the machine learning start time, as a reference, thereby, performing machine learning (reinforcement learning) for reducing the number of imaging pieces and positions of imaging, and reducing a cycle time of the inspection.

Next, before each function block included in the machine learning device 10 is described, the basic mechanism of the reinforcement learning will be described. In the reinforcement learning, an agent (corresponding to the machine learning device 10 in the present embodiment) observes an environmental state, and selects an action, and the environment is changed on the basis of the action. In accordance with the environmental change, some reward is given, and the agent learns selection (decision making) of a better action. While learning with a teacher presents a complete correct solution, the reward in the reinforcement learning often presents a fragmental value based on change of part of the environment. Thus, the agent learns to select an action so that the total reward in the future is the maximum.

In this way, in the reinforcement learning, by learning an action, a suitable action is learned in consideration of the mutual effect of the action with the environment, that is, a method of learning for maximizing the reward to be obtained in the future is learned. This indicates that, for example, an action affecting the future, of carefully inspecting places having high possibility of generation of a flaw, and briefly inspecting positions having low frequency of generation of a flaw, thereby, optimizing the number of imaging pieces and imaging positions, and reducing a cycle time of the inspection, can be acquired in the present embodiment.

As the reinforcement learning, an arbitrary learning method is used. In the description below, a case where Q-learning that is a method of learning a value Q (s, a) of selecting an action a, is used under an environmental state s will be described as an example. An object of the Q-learning is to select the action a having the highest value Q (s, a) as an optimal action, from among actions a that can be taken, in a state s.

However, at the time when the Q-learning is performed for the first time, for combination of the state s and the action a, the correct value of the value Q (s, a) is not identified at all. Thus, the agent selects various actions a under a state s, and selects a better action on the basis of the given reward, to learn the correct value Q (s, a) with respect to the action a.

The agent tries to ultimately obtain the value Q (s, a)=$E[\Sigma(\gamma^t)r^t]$, in order to maximize the total reward that can be acquired in the future. E[ ] represents an expected value, t represents time, γ represents a parameter called a discount rate described later, $r_t$ is a reward at the time t, and Σ represents the total by the time t. The expected value in this formula is an expected value in a case where the state is changed according to the optimal action. However, the optimal action is not clear in a process of the Q-learning. Thus, the agent takes various actions to perform the reinforcement learning while searching. An updating formula of such value Q (s, a) can be represented by, for example, the following [formula 1].

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right) \quad \text{[Formula 1]}$$

In the formula (1) described above, $s_t$ represents an environmental state at the time t, and at represents an action at the time t. The state is changed to $s_{t+1}$ by the action $a_t$. $r_{t+1}$ represents reward obtained by the state change. An item added with max is obtained by multiplying γ to the Q value of when the action a having the highest Q value that has been identified at that time, is selected, under the state $s_{t+1}$. The γ is a parameter of 0<γ≤1, and is called a discount rate, α is a learning coefficient, and is in a range of 0<α≤1.

The formula (1) described above represents a method of updating the value Q ($s_t$, $a_t$) of the action $a_t$ in the state $s_t$, on the basis of the reward $r_{t+1}$ sent back as a result of a trial $a_t$. This updating formula represents that the value Q ($s_t$, $a_t$) is set to be large when a value $\max_a Q(s_{t+1}, a)$ of the best action in the next state $s_{t+1}$ by the action $a_t$ is larger than the value $Q(s_t, a_t)$ of the action $a_t$ in the state $s_t$, while the value $Q(s_t, a_t)$ is set to be small when the value $\max_a Q(s_{t+1}, a)$ of the best action in the next state $s_{t+1}$ by the action $a_t$ is smaller. That is, a value of an action in a state is approximated to a value of the best action in the next state by the action. The difference between them changes depending on the discount rate γ and the reward $r_{t+1}$. However, basically, the mechanism is such that a value of the best action in a state is propagated to a value of an action in a state that is one before that state.

In the Q-learning, there is a method of learning by creating a table of the value Q (s, a) for every state action pair (s, a). However, when the values of the value Q (s, a) of all state action pairs are determined, the number of states is too large, and there is a case where much time is required for settling the Q-learning.

Thus, a known technique called a Deep Q-Network (DQN) may be utilized. Particularly, the agent may configure the value function Q by using an appropriate neural network, and adjust a parameter of the neural network, to approximate the value function Q by the appropriate neural network, to calculate the value of the value Q (s, a). The agent can reduce the time required for settling the Q-learning, by utilizing the DQN. The DQN is described in detail, for example, in the non-patent document below.

<Non-Patent Document>

"Human-level control through deep reinforcement learning", Volodymyr Mnihl [online], [searched on Mar. 17, 2017], Internet <URL: http://files.davidqiu.com/research/nature14236.pdf>

The Q-learning described above is performed by the machine learning device 10. Particularly, the machine learning device 10 observes as an environmental state s, a state specified by the imaging position information transmitted from the control device 300 (imaging information transmission unit 350), and the flaw detection information including the flaw detection position in the imaging position related to the imaging position information, transmitted from the flaw inspection device 400 (flaw detection information transmission unit 430), for each of the plurality of workpieces 50 (hereinafter, referred to as "learning workpieces") prepared in advance, and selects adjustment of the imaging position information (the imaging points and the imaging region) in the environmental state s, as the action a, to learn the value Q. That is, in the machine learning in the present embodiment, learning of all workpieces 50 is substantially difficult. Thus, it is assumed that a pattern of a flaw in the position in which a flaw is easy to be generated, and the angle and position in which a flaw is easy to be found, is specified in the same workpiece 50 on the basis of a set of the flaw detection information detected in each of the plurality of learning workpieces 50 prepared in advance (so called sampling survey). Accordingly, when the plurality of learning workpieces 50 are prepared, it is desirable that a sample (the plurality of learning workpieces 50) well indicates a characteristic of the entire population of the workpiece 50, that is, the sample is extracted so as to be a preferable epitome of the population. Hereinafter, the number of the learning workpieces 50 is M, and each of the learning workpieces 50 is identified by an index k (1≤k≤M).

The machine learning device 10 calculates the reward every time the action a is performed, for learning of the value Q. The machine learning device 10, for example, searches for an optimal action a so that the total reward in the future is the maximum, through trial and error. Thereby, the machine learning device 10 can select the optimal action a with respect to the environmental state s.

At this time, the machine learning device 10 needs to detect correct flaw detection information for the plurality of workpieces 50 before the start of the machine learning, in order to determine whether there is leakage in the flaw detection information observed in each environmental state s. Thus, the machine learning device 10 is configured to set the initial state $s_0$ in advance, and determine the flaw detection information in each state s after the machine learning start, with the flaw detection information observed in the initial state $s_0$ as a reference. The reward calculated every time the action a is performed is calculated on the basis of the determination of the flaw detection information in the state s.

In this way, the machine learning device 10 learns the value function Q. The action a having the maximum Q value is selected from among actions a applied to a state s, on the basis of the learned value function Q, and thereby, for example, optimal imaging position information (the imaging point and the imaging region) with which the same flaw detection information as the flaw detection information observed in the initial state $s_0$ can be detected, can be obtained.

<Function block of Machine Learning Device 10>

Figure 6:
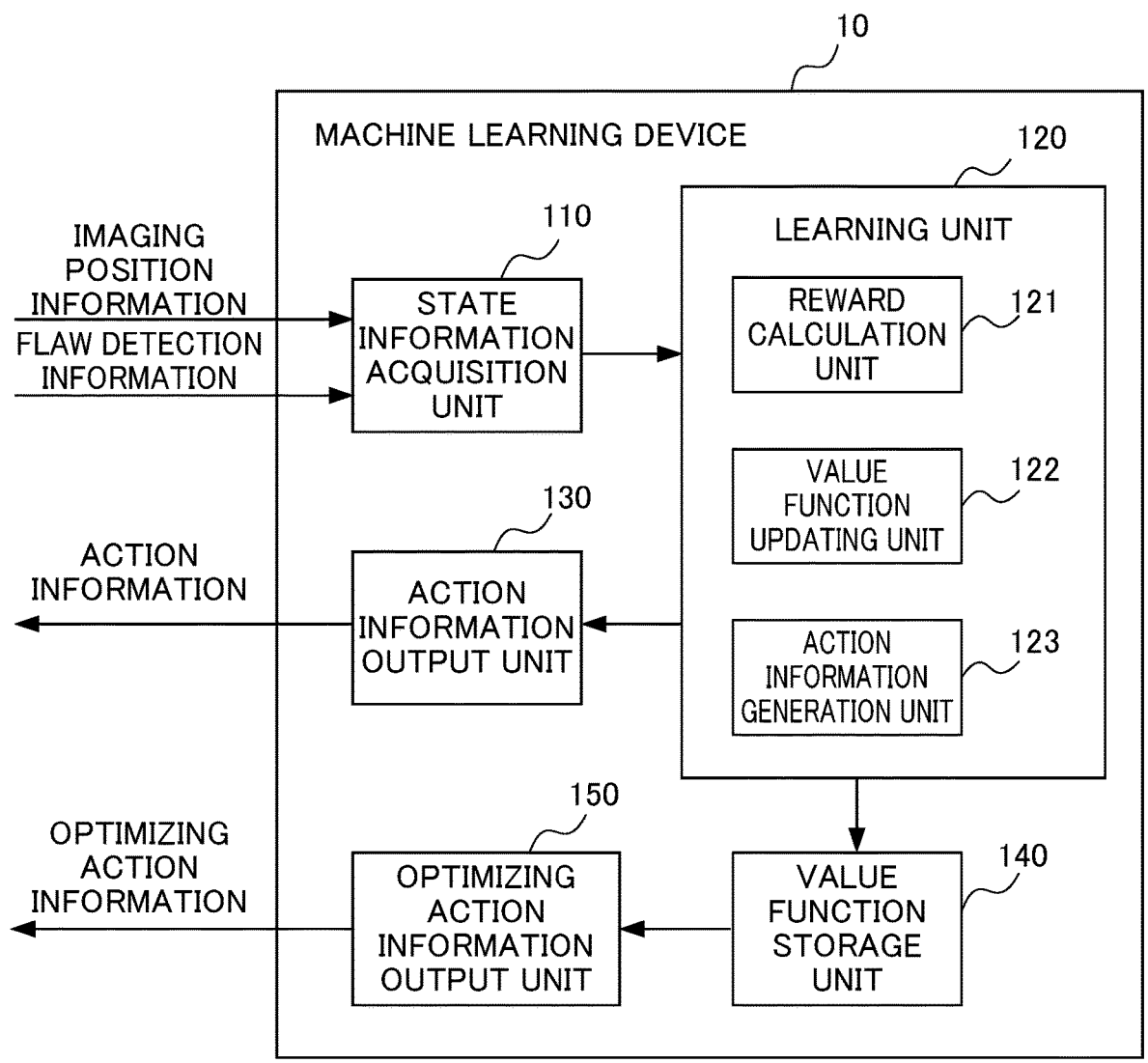
FIG. 6 shows a function block diagram of a machine learning device 10 in the embodiment of the present invention.

Next, the function blocks of the machine learning device 10 that performs the reinforcement learning described above will be described with reference to FIG. 6. As shown in FIG. 6, the machine learning device 10 includes a state information acquisition unit 110, a learning unit 120, an action information output unit 130, a value function storage unit 140, and an optimizing action information output unit 150. The learning unit 120 includes a reward calculation unit 121, a value function updating unit 122, and an action information generation unit 123.

The state information acquisition unit 110 acquires the state information s including the imaging position information (the imaging point and the imaging region) set in the control device 300, the number of imaging, and the flaw detection information of the learning workpiece 50(k) (1≤k≤M) detected by the flaw inspection device 400, from the control device 300 and the flaw inspection device 400, respectively. This state information s corresponds to the environmental state s in the Q learning. The state information acquisition unit 110 outputs the acquired state information s to the learning unit 120.

<Imaging Position Information in Initial State $s_0$>

In starting of the machine learning of the machine learning device 10, the initial state $s_0$ is, for example, set as follows. For example, as shown in FIG. 4A, it is preferable that, in the imaging positions shown by the imaging position information included in the initial state $s_0$, the imaging region is made small, and the imaging point is finely set for even imaging of the surface to be inspected of the workpiece 50, so that inspection omission and overlooking of a flaw do not occur. At this time, for example, the imaging point and the imaging region may be set so that the imaging region of each imaging point overlaps with an imaging region of a near imaging point. As shown in FIG. 4C to FIG. 4E, it is preferable that a plurality of orientations are set so that orientations of the learning workpieces 50 vary in the same imaging point, so that the imaging appearance of a flaw due to the positional relationship of the camera 210 and the illumination 220, and the surface to be inspected of the learning workpiece 50 is considered. In the present embodiment, the imaging point and the imaging region are set so as to be evenly set as shown in FIG. 4A. However, the imaging point and the imaging region are not limited to this. It is sufficient that the entirety can be finely imaged without inspection omission and overlooking of a flaw, and the imaging point and the imaging region may not be even. The imaging position corresponding to the imaging position information included in the initial state $s_0$ (the imaging point, the distance from the camera 210 to the imaging point, and the orientation of the learning workpiece 50 in the imaging point) are identified by an index. That is, in the initial state $s_0$, N imaging points (i) (1≤i≤N) are set, the distance set from the camera 210 in the imaging points (i) to the imaging point is set to be D(i), and the orientation of the learning workpiece 50 in the imaging points (i) is set to be R(i, j). It is assumed that the orientation of the learning workpiece 50 in the imaging points (i) is defined for the number of n(i) that is 1 or more (1≤i≤n (i)). Accordingly, as described above, each imaging region (i, j) {1≤i≤N, 1≤j≤n (i)} in the imaging points (i) is uniquely determined by the imaging points (i), the distance set from the camera 210 to the imaging points (i) of D(i), and the orientation R(i, j) of the learning workpiece 50 in the imaging points (i).

<Flaw Detection Information in Initial State $s_0$>

The flaw detection information in the initial state $s_0$ is detected for each imaging region (i, j) {1≤i≤N, 1≤j≤n (i)} included in the initial state $s_0$ with respect to each learning workpiece 50(k) (1≤k≤M). For the flaw detection information in the initial state $s_0$, the position information of all flaws on the surface to be inspected, detected for each learning workpiece 50(k), and the flaw detection information including the number of flaws are stored as flaw detection table_initial state $s_0$, in a storage unit (not shown). The imaging point and the imaging region having the equal accuracy to the flaw inspection in the initial state $s_0$, and the minimum number of imaging can be determined by adjusting the imaging region (i, j) {1≤i≤N, 1≤j≤n (i)} included in the initial state $s_0$ described above, by the machine learning (reinforcement learning) described later. More particularly, in the state s, the position information of all flaws on the surface to be inspected and the flaw detection information including the number of flaws that are detected for each learning workpiece 50(k), are stored as flaw detection table_state s, in a storage unit (not shown).

The learning unit 120 is a unit that learns the value Q (s, a) of when an action a is selected under an environmental state s. In order to perform this learning, the learning unit 120 includes the reward calculation unit 121, the value function updating unit 122, and the action information generation unit 123.

The reward calculation unit 121 calculates the reward of when the action a is selected under a state s. It is assumed that a state of when the action a is performed is s'. The reward calculation unit 121 compares the flaw detection table_state s' and the flaw detection table_initial state $s_0$ for each learning workpiece 50(k), to determine whether the flaw detection information included in the state s' and the flaw detection information included in the initial state $s_0$ indicate the same detection result (for example, the numbers of the flaw detection positions in the surface to be inspected of the learning workpiece 50(k) are the same). When the same detection results are shown and the number of imaging included in the state s' is less than the number of imaging in the initial state $s_0$, the reward calculation unit 121 sets the value of the reward r to be a positive value. More particularly, the reward calculation unit 121 determines whether the results are the same by comparing the flaw detection table_state s and the flaw detection table initial state $s_0$ for each learning workpiece 50(k). When the flaw detection information of the learning workpiece 50(k) included in the state s' and the flaw detection information of the learning workpiece 50(k) included in the initial state $s_0$ indicate the same detection results (for example, the numbers of the flaw detection positions in the surface to be inspected of the learning workpiece 50(k) are the same), and the number of imaging included in the state s' is equal to the number of imaging in the initial state $s_0$, the value of the reward r is set to be zero. On the contrary, when the flaw detection information of the learning workpiece 50(k) included in the state s' is less than the flaw detection information of the learning workpiece 50(k) included in the initial state $s_0$ (for example, the number of the flaw detection positions in the surface to be inspected of the learning workpiece 50(k) is small), the value of the reward r is set to be a negative value. In the learning in the present embodiment, it is assumed that the pieces of flaw detection information are the same. Thus, it is desirable that an action with which the reward becomes a negative value is not selected. Thus, as a negative value, for example, a large negative value may be set. When the flaw detection information of the learning workpiece 50(k) included in the state s' and the flaw detection information of the learning workpiece 50(k) included in the initial state $s_0$ indicate the same detection result (for example, the numbers of the flaw detection positions in the surface to be inspected of the workpiece 50 are the same), a value of the reward r may be set to be larger as the number of imaging of the state s' is smaller than the number of imaging in the initial state $s_0$.

The value function updating unit 122 performs Q-learning on the basis of the state s, the action a, the state s' of when the action a is applied to the state s, and the reward value calculated as described above, to update a value function Q that the value function storage unit 140 stores.

Updating of the value function Q may be performed by online learning, batch learning, or mini-batch learning. The online learning is a learning method of applying an action a to the current state s to update the value function Q immediately every time the state s makes a transition to a new state s'. The batch learning is a learning method of applying an action a to the current state s to repeat the transition of the state s to the new state s' to collect learning data and perform updating of the value function Q by using all the collected learning data. Further, the mini-batch learning is an intermediate learning method between the online learning and the batch learning, and is a learning method of performing updating of the value function Q every time certain pieces of learning data are accumulated.

Figure 7:
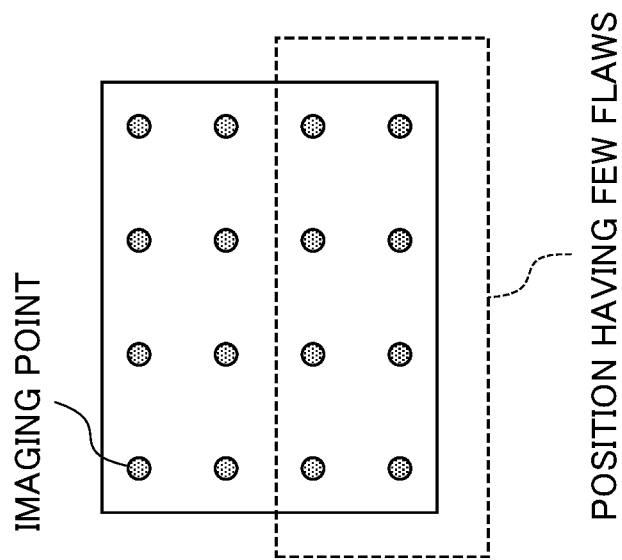
FIG. 7 is a diagram showing an example of adjustment of action information in machine learning in the embodiment of the present invention.
Figure 7:
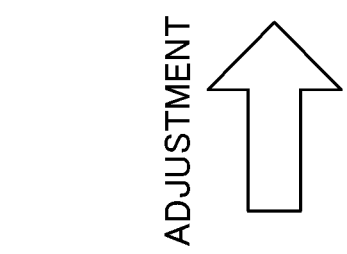

The action information generation unit 123 selects the action a in a process of the Q-learning, with respect to the current state s. The action information generation unit 123 generates the action a with which the number of imaging is decreased, in the process of the Q-learning. For example, as shown in FIG. 7, the action information generation unit 123 may generate the action a with which the distance from the camera 210 to the imaging point is adjusted to be large, in a focus range, in the imaging positions in which no flaw detection position is detected, in almost all learning workpiece 50(k) (1≤k≤M) in the flaw detection table_initial state $s_0$. The field of view is enlarged, and thereby, when the other imaging positions are covered, the number of imaging positions can be decreased. More particularly, as described above, the flaw detection information of the learning workpiece 50(k) (1≤k≤M) in the initial state $s_0$ is detected for each imaging region (i, j) {1≤i≤N, 1≤j≤n(i)} included in the initial state $s_0$. The action a can be generated by adjusting the imaging region (i, j) {1≤i≤N, 1≤j≤n(i)} included in the initial state $s_0$. That is, for example, when the same flaw can be detected by a plurality of orientations (≤n(i)) in the imaging point (i), the action a of adjusting to limit the orientation may be generated. For example, as shown in FIG. 7, when there are almost no flaw detection positions of the learning workpiece $50(k)$ (1≤k≤M) in the plurality of imaging regions, the action a of selecting the imaging point (i) included in the plurality of imaging regions to adjust the distance from the camera 210 to the imaging point (i) to be large in a focus range, may be generated. Imaging in the imaging point (1) located near the imaging point (i) can be omitted by increasing the imaging region including the imaging point (i), and the action a of decreasing the number of imaging can be generated. The action information generation unit 123 may take a measure of randomly selecting the action a. In addition, the action information generation unit 123 may take another measure of selecting the action a, by a known method such as the greedy method of selecting the action a having the highest value Q (s, a) from among values of the action a currently estimated, or the εgreedy method of randomly selecting the action a with a small probability ε, and other than that, selecting the action a having the highest value Q (s, a).

The action information output unit 130 transmits the action information a output from the learning unit 120 to the imaging position setting unit 310 of the control device 300. Thereby, the robot control inspection system 20 makes a transition to a next state s' (that is, imaging in the imaging positions on the basis of the corrected imaging position information and flaw detection utilizing the obtained image).

<Generation Timing of Action a>

The timing of generation of the action a of the action information calculation unit 130 will be described. In the present embodiment, a more effective action a can be generated by comparing the flaw detection information of the all learning workpieces $50(k)$ (1≤k≤M) (included in the state s) and the flaw detection information of all learning workpieces $50(k)$ (1≤k≤M) included in the initial state $s_0$. Thus, the action information calculation unit 130 is configured to generate the action a after acquiring the flaw detection information of the all learning workpieces $50(k)$ (1≤k≤M) (included in the state s). On the other hand, as described above, when the number of the flaw detection positions of the learning workpiece $50(m)$ in arbitrary m (1≤m≤M), included in the state s of this time is smaller than the number of the flaw detection positions of the learning workpiece $50(m)$ included in the initial state $s_0$, the reward calculation unit 121 can set the reward to be a negative value irrespective of the flaw detection information of the learning workpiece $50(k)$ (k>m) thereafter. Accordingly, when the number of the flaw detection positions of the learning workpiece $50(m)$ in arbitrary m (1≤m≤M) included in the state s of this time is smaller than the number of the flaw detection positions of the learning workpiece $50(m)$ included in the initial state $s_0$, the action information calculation unit 130 may generate the action a irrespective of the flaw detection information of the learning workpiece $50(k)$ (k>m) thereafter. Thereby, the flaw detection work of the learning workpiece $50(k)$ (k>m) is omitted in the state s of this time, and the state may be made to transition to the next state s' (that is, imaging in the imaging position on the basis of the corrected imaging position information, and flaw detection utilizing the obtained image) by the action information output unit 130. Thereby, the machine learning time can be reduced.

The value function storage unit 140 is a storage device that stores the value function Q. The value function Q may be stored in a table, for example, for every state s and every-action a. The value function Q stored in the value function storage unit 140 is updated by the value function updating unit 122. The value function Q stored in the value function storage unit 140 may be shared with the other machine learning devices 100. When the value function Q is shared among a plurality of machine learning devices 100, distributed reinforcement learning can be performed by the machine learning devices 100. Thus, efficiency of the reinforcement learning can be improved.

The optimizing action information output unit 150 creates the action information a (hereinafter, referred to as "optimizing action information") of adjusting the imaging position information with which the value Q (s, a) is the maximum, on the basis of the value function Q updated by the Q-learning by the value function updating unit 122.

More particularly, the optimizing action information output unit 150 acquires the value function Q stored in the value function storage unit 140. This value function Q is updated by performing of the Q-learning by the value function updating unit 122 as described above. Then, the optimizing action information output unit 150 creates the optimizing action information on the basis of the value function Q and the initial state $s_0$ to output the created optimizing action information to the robot control inspection system 20. This optimizing action information includes action information of adjusting the imaging position information, as similar to the action information output in the process of the Q-learning by the action information output unit 130.

In the robot control inspection system 20, the imaging position information (the imaging point and the imaging region) is corrected on the basis of this optimizing action information. As described above, the number of imaging pieces and the number of imaging positions in the robot control inspection system 20 can be optimized by utilizing the machine learning device 10.

The function blocks included in the machine learning device 10, the control device 300, and the flaw inspection device 400 are described above. In order to realize these function blocks, the machine learning device 10, the control device 300, and the flaw inspection device 400 include an operation processing device such as a central processing unit (CPU). The machine learning device 10, the control device 300, and the flaw inspection device 400 also include a sub storage device such as a hard disk drive (HDD) stored with various control programs such as application software and an operating system (OS), and a main storage device such as a random access memory (RAM) for storing data temporarily required for execution of the program by the operation processing device.

In the machine learning device 10, the control device 300, and the flaw inspection device 400, while reading the application software and the OS from the sub storage device, and decompressing the read application software and OS into the main storage device, the operation processing device performs operation processing based on these application software and OS. The machine learning device 10, the control device 300, and the flaw inspection device 400 control various hardware included in each device, on the basis of this operation result. Thereby, the function blocks of the present embodiment are realized. That is, the present embodiment can be realized by cooperation of hardware and software.

As a particular example, the machine learning device 10 can be realized by incorporating application software for realizing the present embodiment to a general personal computer. The control device 300 can be realized by incorporating application software for realizing the present embodiment to the control device of the general robot 100. The flaw inspection device 400 can be realized by incorporating application software for realizing the present embodiment to a general personal computer.

The machine learning device 10 performs a large amount of operation associated with the machine learning. Thus, it is desirable that, for example, a personal computer is mounted with graphics processing units (GPUs), and the GPUs are utilized for the operation processing associated with the machine learning by a technique called general-purpose computing on graphics processing units (GPGPU), so that the machine learning device 10 can perform high speed processing. Further, in order to perform higher speed processing, in the machine learning device 10, a plurality of such computers mounted with the GPU may be used to construct a computer cluster, so that parallel processing is performed by the plurality of computers included in the computer cluster.

Figure 8:
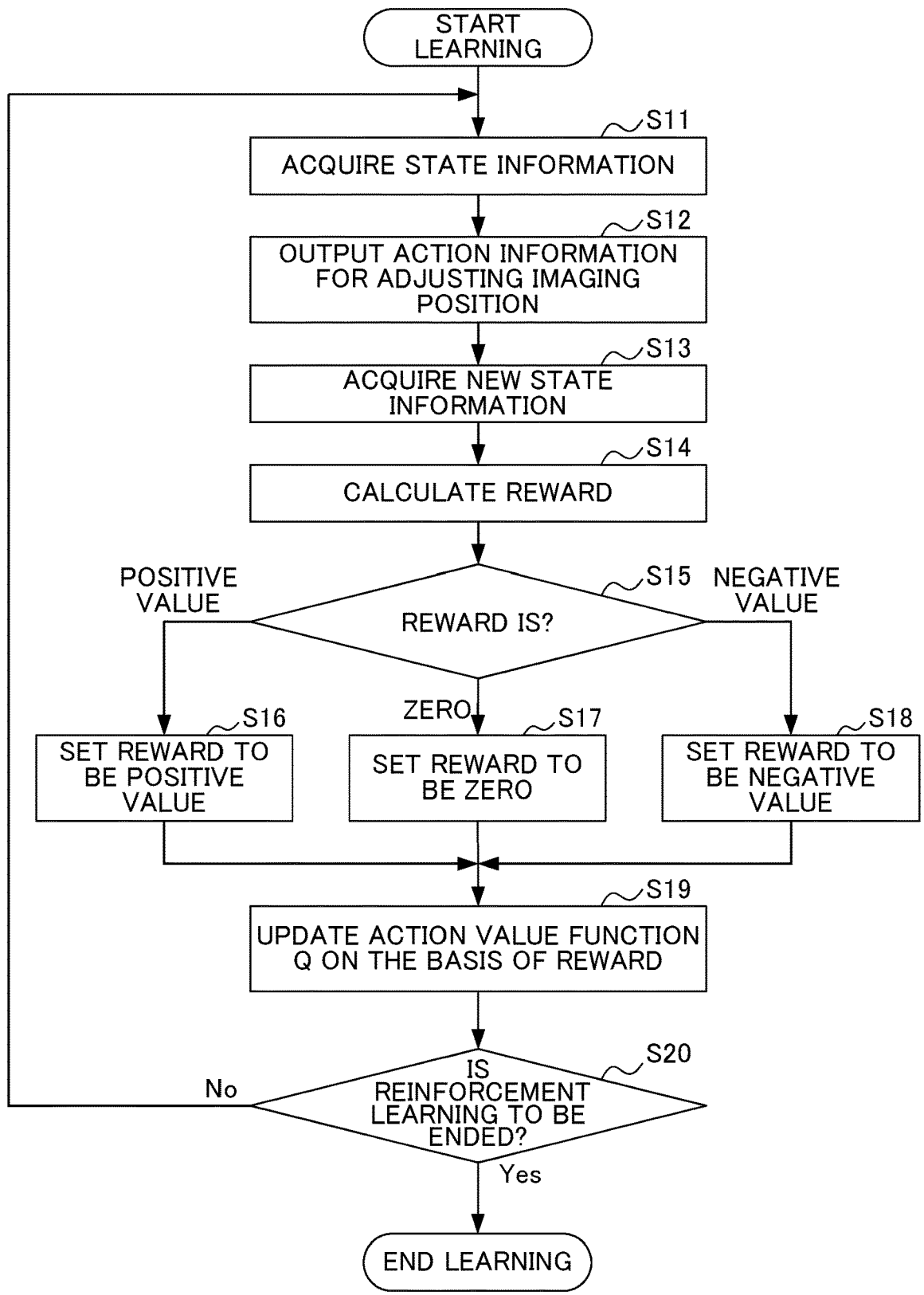
FIG. 8 is a flowchart for explaining the operation of the machine learning device in a learning phase, in the embodiment of the present invention.

Next, the machine learning device 10 at the time of Q-learning will be described with reference to a flowchart of FIG. 8. It is assumed that, before the start of step S11, the plurality of learning workpieces 50(*k*) (1≤k≤M) as samples, and the imaging position information included in the initial state $s_0$ are set in advance, and the flaw detection information in the initial state $s_0$ is detected and stored as flaw detection table_initial state $s_0$, in a storage unit (not shown).

In step S11, the state information acquisition unit 110 acquires the state information s including the imaging position information set in the control device 300, and the flaw detection information of the learning workpiece 50(*k*) (1≤k≤M) detected by the flaw inspection device 400. The acquired state information is output to the value function updating unit 122 and the action information generation unit 123. As described above, this state information s is information corresponding to the environmental state s in the Q-learning.

In step S12, the action information generation unit 123 generates new action information a, and outputs the generated new action information a to the imaging position setting unit 310 of the control device 300 via the action information output unit 130. The action information generation unit 123 outputs the new action information a on the basis of the measure described above. The control device 300 that has received the action information a causes the robot control inspection system 20 to perform a flaw inspection process of the learning workpiece 50(*k*) (1≤k≤M), with the state s' obtained by correcting the imaging position information related to the current state s on the basis of the received action information a. As described above, this action information corresponds to the action a in the Q-learning.

In step S13, the state information acquisition unit 110 acquires the state information s' in the new state s' from the robot control inspection system 20. The acquired state information s' is output to the reward calculation unit 121.

In step S14, the reward calculation unit 121 performs calculation of the reward on the basis of the flaw detection information and the number of imaging included in the initial state $s_0$, and the flaw detection information and the number of imaging included in the state information s' of this time.

In step S15, whether the reward is set to be a positive value, a negative value, or zero is determined.

When the reward is a positive value, the process proceeds to step S16. In step S16, the positive value is output as the reward, to the value function updating unit 122. When the reward is set to be zero, the process proceeds to step S17. In step S17, zero is output as the reward, to the value function updating unit 122. When the reward is set to be a negative value, the process proceeds to step S18. In step S18, the negative value is output as the reward, to the value function updating unit 122. Any of step S16, step S17, and step S18 ends, the process proceeds to step S19, In step S19, the value function updating unit 122 updates the value function Q stored in the value function storage unit 140 on the basis of the reward value output in any step of step S16, step S17, and step S18. Although online updating is exemplified for step S19, batch updating or mini batch updating may be performed instead of the online updating.

In step S20, the learning unit 120 determines whether a condition to end the reinforcement learning is satisfied. The condition to end the reinforcement learning is, for example, repeating the processing described above for a predetermined number of times or for predetermined time. When the condition to end the reinforcement learning is not satisfied yet, it is determined to be No in step S20, and the processing returns to step S11. The processing described above is repeated, and thereby, the value function Q settles to a suitable value. On the other hand, when the condition to end the reinforcement learning is satisfied, it is determined to be Yes in step S20, and the processing ends.

In the present embodiment, the value function for optimizing the number of imaging pieces and the number of imaging positions can be obtained by utilizing the machine learning device 100, by the operation described with reference to FIG. 8.

Figure 9:
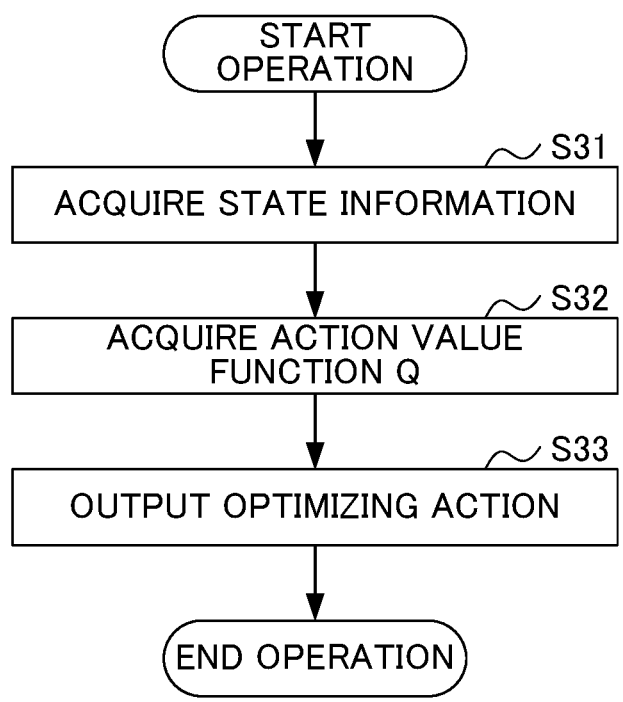
FIG. 9 is a flowchart for explaining the operation of the machine learning device in an operation phase, in the embodiment of the present invention.

Next, operation at the time of generation of the optimizing action information by the optimizing action information output unit 150 will be described with reference to a flowchart of FIG. 9. First, in step S31, the state information acquisition unit 110 acquires the state information s from the robot control inspection system 20.

In step S32, the optimizing action information output unit 150 acquires the value function Q stored in the value function storage unit 140. The value function Q has been updated by performing of the Q-learning by the value function updating unit 122 as described above.

In step S33, the optimizing action information output unit 150 generates optimizing action information on the basis of the imaging position information included in the state information s acquired in step S31, and the value function Q acquired in step S32. The optimizing action information output unit 150 outputs the generated optimizing action information to the imaging position setting unit 310 of the robot control inspection system 20 (the control device 300). This optimizing action information is information for optimizing the number of imaging pieces and the imaging positions.

In the robot control inspection system 20, the number of imaging pieces and the number of imaging positions are optimized on the basis of this optimizing action information, and the cycle time of the inspection is reduced. As described above, by utilizing the machine learning device 10 according to the present invention, positions having high possibility of generation of a flaw are carefully inspected, and positions having low frequency of generation of a flaw and low importance are briefly inspected, and thereby, the number of imaging pieces and imaging positions can be optimized, and the cycle time of the inspection can be reduced.

<Cooperation of Hardware and Software>

Each device included in the machine learning system 1 described above may be realized by hardware, software or combination thereof. The machine learning method performed by each device included in the machine learning system 1 described above, also may be realized by hardware, software, or combination thereof. Being realized by software means being realized by reading and executing a program by a computer, The program may be stored by using various types of non-transitory computer readable media, and supplied to the computer. The non-transitory computer readable media include various types of tangible storage media. Examples of the non-transitory computer readable media include a magnetic recording medium (for example, a flexible disk, a magnetic tape, or a hard disk drive), a magneto-optical recording medium (for example, a magneto-optical disk), a CD-ROM (read only memory), a CD-R, a CD-R/W, a semiconductor memory (for example, a mask ROM, a programmable ROM (PROM), an erasable PROM (EPROM), a flash ROM, or a random access memory (RAM). The program may be supplied to a computer by various types of transitory computer readable media. Examples of the transitory computer readable media include an electrical signal, an optical signal, and an electromagnetic wave. The transitory computer readable media can supply a program to a computer via a wired communication path such as a wire or an optical fiber, or a wireless communication path.

Although the embodiment described above is a preferable embodiment of the present invention, the scope of the present invention is not limited thereto. The present invention may be performed in an embodiment in which various modifications are performed without departing from the gist of the present invention.

<Variation 1>

In the present embodiment described above, machine learning of determining the imaging point and the imaging region having the equal accuracy to the flaw inspection in the initial state $s_0$, and having the minimum number of imaging, by adjusting the imaging region (i, j) {1≤i≤N, 1≤j≤n (i)} included in the initial state $s_0$, is performed. On the other hand, in the flaw inspection in the predetermined region of the surface to be inspected, machine learning of determining the imaging point and the imaging region having the equal accuracy to the flaw inspection in the initial state $s_0$, and having the minimum number of imaging, may be performed. In this case, the reward calculation unit 121 can set the reward value to be a positive value when the number of the flaw detection positions in a predetermined region (for example, a region excluding positions having low importance) of the surface to be inspected, detected by the flaw inspection device 400 is equal to the number of the flaw detection positions in the predetermined region of the surface to be inspected, detected by the flaw inspection device 400 in the initial state $s_0$ at the machine learning start time, and when the number of imaging is smaller than the number of imaging in the initial state $s_0$, and set the reward value to be a negative value when the number of the flaw detection positions in the predetermined region of the surface to be inspected, detected by the flaw inspection device 400 is smaller than the number of the flaw detection position in the predetermined region of the surface to be inspected, detected by the flaw inspection device 400 in the initial state $s_0$ at the machine learning start time. Thereby, in the flaw inspection in the predetermined region of the surface to be inspected, optimizing can be performed for having the equal accuracy to the flaw inspection in the initial state $s_0$, and the minimum imaging number.

<Variation 2>

In the embodiment described above, determination of a flaw is performed, for example, on the basis of a brightness value set in advance. However, the determination is not limited thereto. For example, as a determination method of a flaw on the surface to be inspected of the workpiece 50, determination of a flaw can be performed by comparing with the image of the workpiece 50 without a flaw, that is imaged in the same optical condition. When this method is applied, for example, the determination of a flaw can be performed as follows. That is, in preparing the plurality of learning workpieces 50(k) (1≤k≤M), one or more workpieces 50 without a flaw are prepared, a difference with an image obtained by imaging the learning workpiece 50(k) (1≤k≤M) is evaluated, with an image obtained by imaging one or more workpieces 50 without a flaw as a reference, in the state s. Thereby, the flaw detection in the state s can be performed in the same optical condition.

<Variation 3>

In the embodiment described above, the reward calculation unit 121 sets the reward value to be larger as the number of imaging is smaller, when the reward is a positive value. However, the reward value is not limited thereto. For example, the reward calculation unit 121 may set the reward value to be larger as the cycle time related to the inspection of the workpiece is smaller, when the reward is a positive value.

<Variation 4>

In the embodiment described above, it is assumed that the machine learning device 10 is realized by the other device than the control device 300 and the flaw inspection device 400. However, part or all of the functions of the machine learning device 10 may be, for example, realized by the control device 300 and the flaw inspection device 400.

<Variation 5>

In the embodiment described above, the machine learning device 10 has the function of performing learning, and the function of generating the action information. However, the function of performing learning and the function of generating the action information may be performed by different devices.

<Variation 6>

In the embodiment described above, the machine learning device 10 and the control device 300 are communicatively connected as a set of one to one. However, for example, one machine learning device 10 may be communicatively connected with the plurality of control devices 300 via the network 70, and perform the machine learning of each control device 300. At that time, respective functions of the machine learning device 10 may be realized by a distributed processing system in which the functions are distributed in a plurality of servers, as appropriate. Each function of the machine learning device 10 may be realized by utilizing a virtual server function, or the like, in a cloud. When the same robot 200 is connected to each of a plurality of control devices 300-1 to 300-n of the same type name, the same specification, or the same series, the machine learning devices 10-1 to 10-n may be configured to share learning results in the machine learning devices 10-1 to 10-n. Thereby, more optimal model can be constructed.

EXPLANATION OF REFERENCE NUMERALS

1 Machine learning system
10 Machine learning device
110 State information acquisition unit
120 Learning unit
121 Reward calculation unit
122 Value function updating unit
123 Action information generation unit 130 Action information output unit
140 Value function storage unit
150 Optimizing action information output unit
20 Robot control inspection system
200 Robot
201 Robot hand
210 Camera
213 Support body
220 Illumination
300 Control device
310 Imaging position information setting unit
320 Movement route calculation unit
330 Movement operation control unit
340 Imaging control unit
350 Imaging information transmission unit
400 Flaw inspection device
410 Imaging information reception unit
420 Flaw detection unit
430 Flaw detection information transmission unit
50 Workpiece
7 0 Network

What is claimed is:

1. A machine learning device for use with, and configured to perform reinforcement learning with respect to a robot control system, the robot control system comprising:
an illumination means that irradiates a surface to be inspected of an object to be inspected with illumination light;
an imaging means that images the surface to be inspected;
a robot that includes a robot hand;
a control unit that, while moving the robot hand gripping the object to be inspected or the imaging means, along a movement route including a plurality of imaging points set on the surface to be inspected so that the surface to be inspected is entirely covered by a plurality of images imaged by the imaging means, causes the imaging means to image the imaging points set on the surface to be inspected; and
a flaw inspection unit that detects a flaw on the surface to be inspected on the basis of the image obtained by imaging the surface to be inspected by the imaging means, the machine learning device comprising:
an action information output unit that outputs action information including adjustment information of the imaging region including the imaging points, to the control unit;
a state information acquisition unit that acquires state information from the control unit and the flaw inspection unit resulting from a number N of images, obtained by imaging the surface to be inspected by the imaging means by moving the robot hand gripping the object to be inspected or the imaging means by the control unit, based on the action information, the state information including the number N and flaw detection information, the flaw detection information including a flaw detection position of the surface to be inspected, detected by the flaw inspection unit, with respect to each of a plurality of objects to be inspected prepared in advance;
a reward output unit that outputs a reward value in the reinforcement learning based on the number N and the flaw detection information including the flaw detection positions included in the state information; and
a value function updating unit that updates an action value function based on the reward value, the state information, and the action information.

2. The machine learning device according to claim 1, wherein the reward output unit
sets the reward value to be a positive value when: (i) the number of the flaw detection positions detected by the flaw inspection unit is equal to the number of the flaw detection positions detected by the flaw inspection unit in an initial state at machine learning start time of imaging a imaging region including predetermined imaging points, and (ii) the number N is smaller than the number of images in the initial state of the machine learning start time, and
sets the reward value to be a negative value when the number of the flaw detection positions detected by the flaw inspection unit is smaller than the number of the flaw detection positions detected by the flaw inspection unit in the initial state of the machine learning start time of imaging the imaging region including the predetermined imaging points.

3. The machine learning device according to claim 2, wherein the reward output unit
sets the reward value to be a larger value as the number N is smaller than the number of images in the initial state of the machine learning start time, when the number of the flaw detection positions detected by the flaw inspection unit is equal to the number of the flaw detection positions detected by the flaw inspection unit in the initial state of the machine learning start time of imaging the imaging region including the predetermined imaging points.

4. The machine learning device according to claim 2, comprising an optimizing action information output unit that generates optimizing action information with which the number of the flaw detection positions is equal to the number of the flaw detection positions detected by the flaw inspection unit in the initial state of the machine learning start time, and the number N is a minimum, based on the action value function updated by the value function updating unit.

5. The machine learning device according to claim 1, wherein the reward output unit
sets the reward value to be a positive value when: (i) the number of the flaw detection positions in the predetermined region of the surface to be inspected, detected by the flaw inspection unit is equal to the number of the flaw detection positions in the predetermined region of the surface to be inspected, detected by the flaw inspection unit in the initial state of the machine learning start time of imaging the imaging region including the predetermined imaging points, and (ii) the number N is smaller than the number of images in the initial state of the machine learning start time,
and sets the reward value to be a negative value when the number of the flaw detection positions in the predetermined region of the surface to be inspected, detected by the flaw inspection unit is smaller than the number of the flaw detection positions in the predetermined region of the surface to be inspected, detected by the flaw inspection unit in the initial state of the machine learning start time of imaging the imaging region including the predetermined imaging points.

6. The machine learning device according to claim 5, wherein the reward output unit
sets the reward value to be a larger value as the number N is smaller than the number of images in the initial state of the machine learning start time, when the number of the flaw detection positions in the predetermined region of the surface to be inspected, detected by the flaw inspection unit is equal to the number of the flaw detection positions in the predetermined region of the surface to be inspected, detected by the flaw inspection unit in the initial state of the machine learning start time of imaging the imaging region including the predetermined imaging points.

7. The machine learning device according to claim 5, comprising an optimizing action information output unit that generates optimizing action information with which the number of the flaw detection positions in the predetermined region of the surface to be inspected is equal to the number of the flaw detection positions in the predetermined region of the surface to be inspected, detected by the flaw inspection unit in the initial state at the machine learning time by imaging the imaging region including the predetermined imaging points, and the number N is a minimum, based on action value function updated by the value function updating unit.

8. The machine learning device according to claim 1, wherein
the action value function is shared with other machine learning devices, and
the value function updating unit updates the action value function that is shared.

9. A system comprising the machine learning device and the robot control system of claim 1.

10. A machine learning method by a machine learning device that performs reinforcement learning with respect to a robot control system,
the robot control system comprising:
an illumination means that irradiates a surface to be inspected of an object to be inspected with illumination light;
an imaging means that images the surface to be inspected;
a robot that includes a robot hand;
a control unit that, while moving the robot hand gripping the object to be inspected or the imaging means, along a movement route including a plurality of imaging points set on the surface to be inspected so that the surface to be inspected is entirely covered by a plurality of images imaged by the imaging means, causes the imaging means to image the imaging points set on the surface to be inspected; and
a flaw inspection unit that detects a flaw on the surface to be inspected on the basis of the image obtained by imaging the surface to be inspected by the imaging means,
the machine learning method comprising:
an action information output step of outputting action information including adjustment information of the imaging region including the imaging points, to the control unit;
a state information acquisition step of, with respect to each of a plurality of objects to be inspected prepared in advance, moving the robot hand gripping the object to be inspected or the imaging means by the control unit on the basis of the action information, and acquiring state information from the control unit and the flaw inspection unit resulting from a number N of images, obtained by imaging the surface to be inspected by the imaging means by moving the robot hand gripping the object to be inspected or the imaging means by the control unit, based on the action information, the state information including the number N and flaw detection information, the flaw detection information including a flaw detection position detected by the flaw inspection unit, and the number of imaging, on the basis of an image obtained by imaging the surface to be inspected by the imaging means;
a reward output step of outputting a reward value in the reinforcement learning based on the number N and the flaw detection information including the flaw detection positions included in the state information; and
a value function updating step of updating an action value function based on the reward value, the state information, and the action information.

* * * * *